United States Patent
Muthiah

(10) Patent No.: US 11,681,464 B2
(45) Date of Patent: Jun. 20, 2023

(54) PREDICTING HOST ACCESS RATES FOR VARIABLE BIT RATE DATA STREAMS USING A DATA STORAGE CONTROLLER

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 170 days.

(21) Appl. No.: 16/896,142

(22) Filed: Jun. 8, 2020

(65) Prior Publication Data
US 2021/0382653 A1   Dec. 9, 2021

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ........ G06F 3/0659; G06F 1/12; G06F 3/0604; G06F 3/0679
USPC ....................................................... 711/103
See application file for complete search history.

(56) References Cited

U.S. PATENT DOCUMENTS

| | | | | |
|---|---|---|---|---|
| 6,937,770 B1* | 8/2005 | Oguz | ................... | H04N 19/176 375/240.2 |
| 7,023,924 B1* | 4/2006 | Keller | .............. | H04N 21/23424 375/240.26 |
| 10,025,532 B2 | 7/2018 | Manohar et al. | | |
| 2003/0223735 A1* | 12/2003 | Boyle | ................ | H04N 21/4147 386/330 |
| 2005/0041661 A1 | 2/2005 | Thorsteinson et al. | | |
| 2006/0093323 A1* | 5/2006 | Itoh | ...................... | G11B 27/036 386/314 |
| 2010/0008385 A1* | 1/2010 | Noronha, Jr. | ...... | H04N 21/4385 370/545 |
| 2014/0181363 A1* | 6/2014 | Hoang | ................ | G06F 12/0246 711/103 |

(Continued)

OTHER PUBLICATIONS

"NVM Express: Base Specification"; NVM Express Revision 1.4; Jun. 10, 2019; https://nvmexpress.org/wp-content/uploads/NVM-Express-1_4-2019.06.10-Ratified.pdf; 403 pages.

(Continued)

*Primary Examiner* — Gautam Sain
(74) *Attorney, Agent, or Firm* — Loza & Loza, LLP; Gabriel Fitch

(57) ABSTRACT

Methods and apparatus for predicting a future estimated host read access rate for variable bit rate (VBR) data streams that include Program Clock Reference (PCR) indicators or other playback clock synchronization values. The VBR data stream may be encoded, for example, as a Motion Picture Experts Group (MPEG)-transport stream (TS). In some examples, a data storage device with a non-volatile memory (NVM) array parses an MPEG-TS VBR data stream retrieved from the NVM array to identify PCRs. Using the PCRs, the device estimates the future host data access rate for additional portions of MPEG-TS VBR data not yet requested by the host. The data storage device may then adaptively adjust background (e.g. overhead) management operations such as garbage collection based on the future host data access rate.

22 Claims, 10 Drawing Sheets

(56) References Cited

U.S. PATENT DOCUMENTS

| | | | | |
|---|---|---|---|---|
| 2014/0304573 | A1* | 10/2014 | Dodson | G06F 11/0751 |
| | | | | 714/807 |
| 2015/0067108 | A1 | 3/2015 | Mamidwar et al. | |
| 2018/0276073 | A1* | 9/2018 | Ide | G06F 3/0679 |
| 2018/0300084 | A1* | 10/2018 | Kachare | G06F 3/0653 |
| 2019/0121417 | A1* | 4/2019 | Schneider | H04W 52/0229 |
| 2019/0355426 | A1* | 11/2019 | Sheperek | G06F 3/0604 |
| 2020/0395066 | A1* | 12/2020 | Ahn | G11C 16/10 |

OTHER PUBLICATIONS

"Digital Video Broadcasting (DVB): Specification for the use of Video and Audio Coding in Broadcasting Applications based on the MPEG-2 Transport Stream"; ETSI; V1.9.1; 2009; https://www.etsi.org/deliver/etsi_ts/101100_101199/101154/01.09.01_60/ts_101154v010901p.pdf; 163 pages.

* cited by examiner

PREDICTING HOST ACCESS RATES FOR VARIABLE BIT RATE DATA STREAMS USING A DATA STORAGE CONTROLLER

FIELD

The subject matter described herein relates to data storage devices and controllers. More particularly, the subject matter relates, in some examples, to the processing of variable bit rate data by a data storage controller of a non-volatile memory (NVM) data storage device.

INTRODUCTION

Data storage devices may store audio/video data in compressed forms in accordance with various protocols, such as protocols specified by the Moving Picture Experts Group (MPEG). The data storage devices may also transfer the data to a host device in accordance with various formats, such as MPEG-transport stream (TS). To allow a host device to properly play back video and/or audio data, MPEG-TS includes Program Clock Reference (PCR) indicators. More specifically, a PCR is a standard 27 MHz or 90 KHz clock reference stored in the transport stream to enable the audio and video playback systems of a host device to present the audio and video data to a user with proper timing and synchronization (i.e. AV sync). For example, PCR indicators may be provided within the MPEG transport stream once every 100 millisecond (ms), though the interval can differ from one stream to another.

MPEG-TS and other data streams may include variable bit rate (VBR) data. For such data, the variable bit rate results in differing amounts of data transferred to the host by the data storage device within uniform intervals of time for both audio and video data (e.g. between equally-spaced PCRs in time). That is, although the playback at the host is performed at a fixed playback speed in accordance with the PCRs, the data storage device may need to process and transfer significantly different amounts of data between consecutive PCRs. It would be helpful to provide improvements within data storage devices in connection with the processing of MPEG-TS VBR data or for the processing of other streams of VBR data.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a data storage device that includes: a data storage memory; and a data storage controller. The data storage controller includes a processor configured to: obtain read commands from a host for reading variable bit rate (VBR) data from the data storage memory; process the read commands to transfer the VBR data to the host as a VBR data stream; identify clock synchronization values within the VBR data stream; and determine a host data access rate for additional VBR data not yet requested by the host, the determination based, in part, on the clock synchronization values.

Another embodiment of the disclosure provides a method for use with a data storage device including data storage memory. The method includes: obtaining read commands from a host for reading variable bit rate VBR data from the data storage memory; executing the read commands to transfer the VBR data to the host as a VBR data stream; identifying clock synchronization values within the VBR data stream; predicting a host data access rate for additional VBR data not yet requested by the host, the prediction based, in part, on the clock synchronization values; and controlling at least one data storage device operation based on the host data access rate.

Yet another embodiment of the disclosure provides an apparatus for use with a data storage memory. The apparatus includes: means for obtaining read commands from a host for reading VBR data from the data storage memory; means transferring the VBR data to the host as a VBR data stream; means for identifying playback clock values within the VBR data stream; and means for predicting a host data access rate for additional VBR data not yet requested by the host based, in part, on the playback clock values.

DETAILED DESCRIPTION

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to data storage devices (DSDs) and to data storage controllers of the DSDs. In the main examples described herein, data is stored within non-volatile memory (NVM) arrays. In other examples, data may be stored in hard disk drives (HDD). DSDs with NVM arrays may be referred to as solid state devices (SSDs). Some SSDs use NAND flash memory, herein "NANDs." A NAND is a type of non-volatile storage technology that does not require power to retain data. It exploits negative-AND, i.e. NAND, logic. For the sake of brevity, an SSD having one or more NAND dies will be used as a non-limiting example of a DSD below in the description of various embodiments. It is understood that at least some aspects described herein may be applicable to other forms of DSDs as well. For example, at least some aspects described herein may be applicable to phase-change memory (PCM) arrays, magneto-resistive random access memory (MRAM) arrays, and resistive random access memory (ReRAM) arrays.

Overview

As noted above, MPEG transports streams may include VBR data. For VBR data, the variable bit rate results in differing amounts of data processed by a DSD within uniform intervals of time for both audio and video data (e.g. between equally-spaced PCRs in time). That is, although playback at a host is performed at a fixed speed in accordance with the PCRs, the DSD may need to process significantly different amounts of data between PCRs.

Herein, methods and apparatus are disclosed for use by DSDs for predicting a future host read access rate for MPEG-TS VBR data or for other streams of VBR data. Briefly, in some examples, the DSD parses an MPEG-TS VBR data stream to identify its PCRs and then estimates a future host data access rate for additional VBR data that has not yet been requested by the host. Note that predicting the actual host data access rate is not the same as predicting a next set of host reads. In many DSDs, a Read Look Ahead (RLA) is performed to predict a next set of host reads, but with VBR data streams, the RLA does not necessarily reveal the actual host data access rate, which is the rate at which data is actually accessed by the host from the DSD (and may be expressed as megabits (MB)/second or gigabits (GB)/sec).

Exemplary Devices, Systems and Procedures

Figure 1:
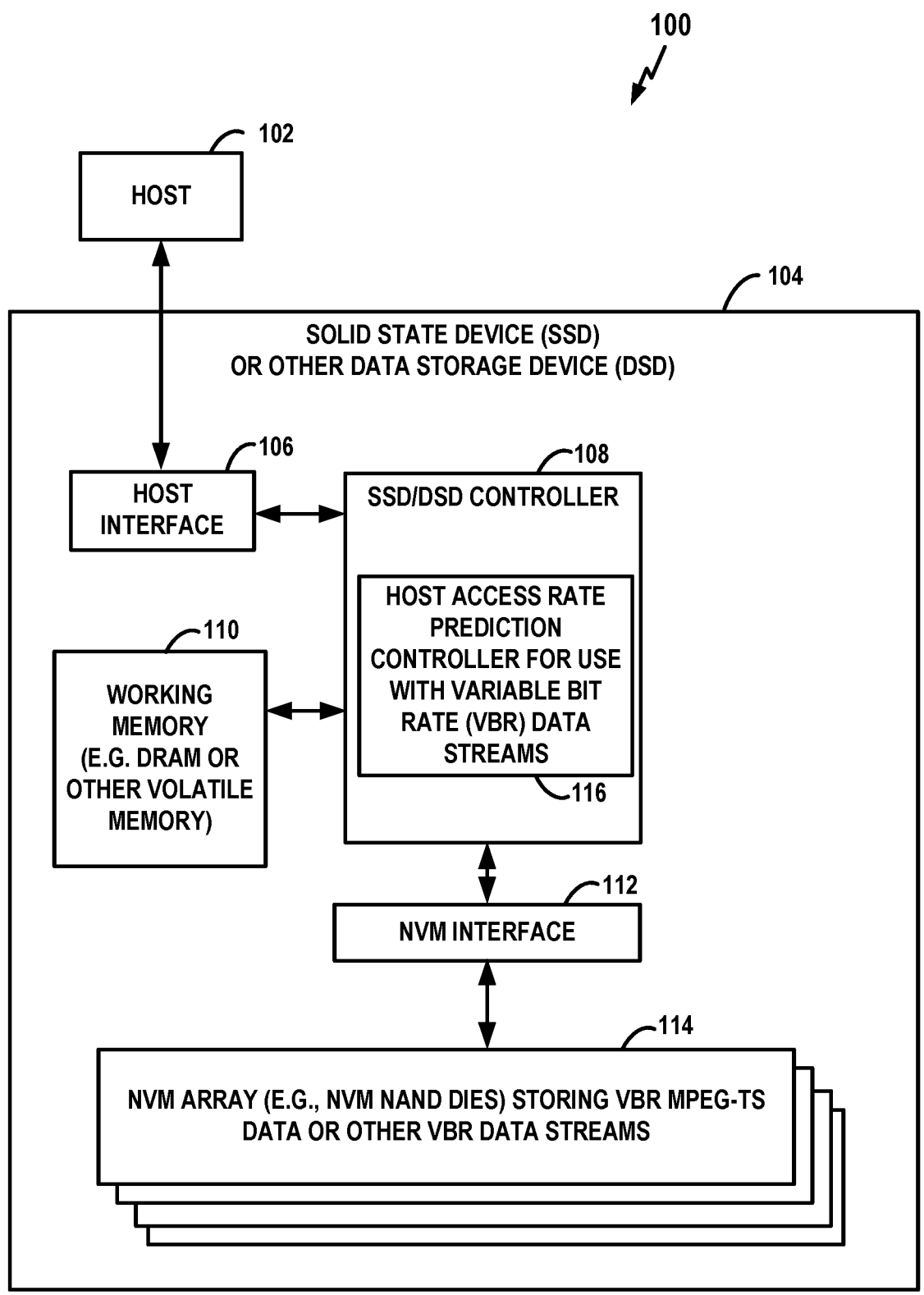
FIG. 1 is a schematic block diagram illustrating a data storage device in the form of an exemplary data storage device (DSD) having an NVM array and a processor configured for predicting a future host access rate for VBR data streams such as MPEG-TS.

FIG. 1 is a block diagram of a system 100 including an exemplary SSD configured for predicting or estimating a future host read access rate of MPEG-TS VBR data or other transport streams of VBR data in accordance with aspects of the disclosure. The system 100 includes a host 102 and an SSD 104 (or other DSD, but for simplicity referred to as an SSD below) coupled to the host 102. The host 102 provides commands to the SSD 104 for transferring data between the host 102 and the SSD 104. For example, the host 102 may provide a write command to the SSD 104 for writing data to the SSD 104 or read command to the SSD 104 for reading data from the SSD 104. The host 102 may be any system or device having a need for data storage or retrieval and a compatible interface for communicating with the SSD 104. For example, the host 102 may a computing device, a personal computer, a portable computer, a workstation, a server, a personal digital assistant, a digital camera, or a digital phone as merely a few examples. Additionally, the host 102 may be a system or device having a need for playing back stored video and/or audio data via an MPEG-TS VBR data stream or other transport streams of VBR data. For example, the commands provided by the host 102 may include read commands for reading video and/or audio data stored in the NVM array 114 in an MPEG-TS VBR format.

The SSD 104 includes a host interface 106, an SSD or DSD controller 108, a working memory 110 (such as DRAM or other volatile memory), an NVM interface 112, and an NVM array 114 having one or more dies storing VBR video and/or audio data. The host interface 106 is coupled to the controller 108 and facilitates communication between the host 102 and the controller 108. The controller 108 is coupled to the volatile memory 110 as well as to the NVM array 114 via the NVM interface 112. The host interface 106 may be any suitable communication interface, such as a Non-Volatile Memory express (NVMe) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host 102 includes the SSD 104. In other embodiments, the SSD 104 is remote from the host 102 or is contained in a remote computing system communicatively coupled with the host 102. For example, the host 102 may communicate with the SSD 104 through a wireless communication link. The NVM array 114 may include multiple dies.

Hence, in some examples, the host may be a laptop computer with an internal SSD and a user of the laptop may wish to playback video stored by the SSD. In other examples, the host again may be a laptop computer but the video is stored by a remote server.

Although, in the example illustrated in FIG. 1, SSD 104 includes a single channel between controller 108 and NVM array 114 via interface 112, the subject matter described herein is not limited to having a single memory channel. For example, in some NAND memory system architectures, two, four, eight or more NAND channels couple the controller and the NAND memory device, depending on controller capabilities. In any of the embodiments described herein, more than a single channel may be used between the controller and the memory die, even if a single channel is shown in the drawings. The controller 108 may be implemented in a single integrated circuit chip and may communicate with different layers of memory in the NVM 114 over one or more command channels.

The controller 108 controls operation of the SSD 104. In various aspects, the controller 108 receives commands from the host 102 through the host interface 106 and performs the commands to transfer data between the host 102 and the NVM array 114. Furthermore, the controller 108 may manage reading from and writing to volatile memory 110 for performing the various functions effected by the controller and to maintain and manage cached information stored in the volatile memory 110.

The controller 108 may include any type of processing device, such as a microprocessor, a microcontroller, an embedded controller, a logic circuit, software, firmware, or the like, for controlling operation of the SSD 104. In some aspects, some or all of the functions described herein as being performed by the controller 108 may instead be performed by another element of the SSD 104. For example, the SSD 104 may include a microprocessor, a microcontroller, an embedded controller, a logic circuit, software, firmware, application specific integrated circuit (ASIC), or any kind of processing device, for performing one or more of the functions described herein as being performed by the controller 108. According to other aspects, one or more of the functions described herein as being performed by the controller 108 are instead performed by the host 102. In still further aspects, some or all of the functions described herein as being performed by the controller 108 may instead be performed by another element such as a controller in a hybrid drive including both non-volatile memory elements and magnetic storage elements.

The working memory 110 may be any suitable memory, computing device, or system capable of storing data. For example, working volatile memory 110 may be ordinary RAM, DRAM, double data rate (DDR) RAM, static RAM (SRAM), synchronous dynamic RAM (SDRAM), a flash storage, an erasable programmable read-only-memory (EPROM), an electrically erasable programmable ROM (EEPROM), or the like. In various embodiments, the controller 108 uses the working memory 110, or a portion thereof, to store data during the transfer of data between the host 102 and the NVM array 114. For example, the working memory 110 or a portion of the volatile memory 110 may be a cache memory. The NVM array 114 receives data from the controller 108 via the NVM interface 112 and stores the data. In some embodiments, working memory 110 may be replaced by a non-volatile memory such as MRAM, PCM, ReRAM, etc. to serve as a working memory for the overall device.

In the example of FIG. 1, the controller 108 may include hardware, firmware, software, or any combinations thereof that provide a host access rate prediction controller 116. For example, the host access rate prediction controller 116 may be configured to predict an estimated future host access rate of MPEG data stored in the NVM array 114 and delivered to the host 102 within MPEG-TS VBR data streams or other transport streams of VBR data that include PCRs (or equivalent data components). Note that a PCR is an example of a clock synchronization value or a playback clock value, although other terms may be used as well.

Although FIG. 1 shows an exemplary SSD and an SSD is generally used as an illustrative example in the description throughout, the various disclosed embodiments are not necessarily limited to an SSD application/implementation. As an example, the disclosed NVM array and associated processing components can be implemented as part of a package that includes other processing circuitry and/or components. For example, a processor may include, or otherwise be coupled with, embedded NVM array and associated circuitry. The processor could, as one example, off-load certain operations to the NVM and associated circuitry and/or components. As another example, the SSD controller 108 may be a controller in another type of device and still be configured to perform or control the prediction of an estimated future host access rate of MPEG data and perform some or all of the other functions described herein.

Figure 2:
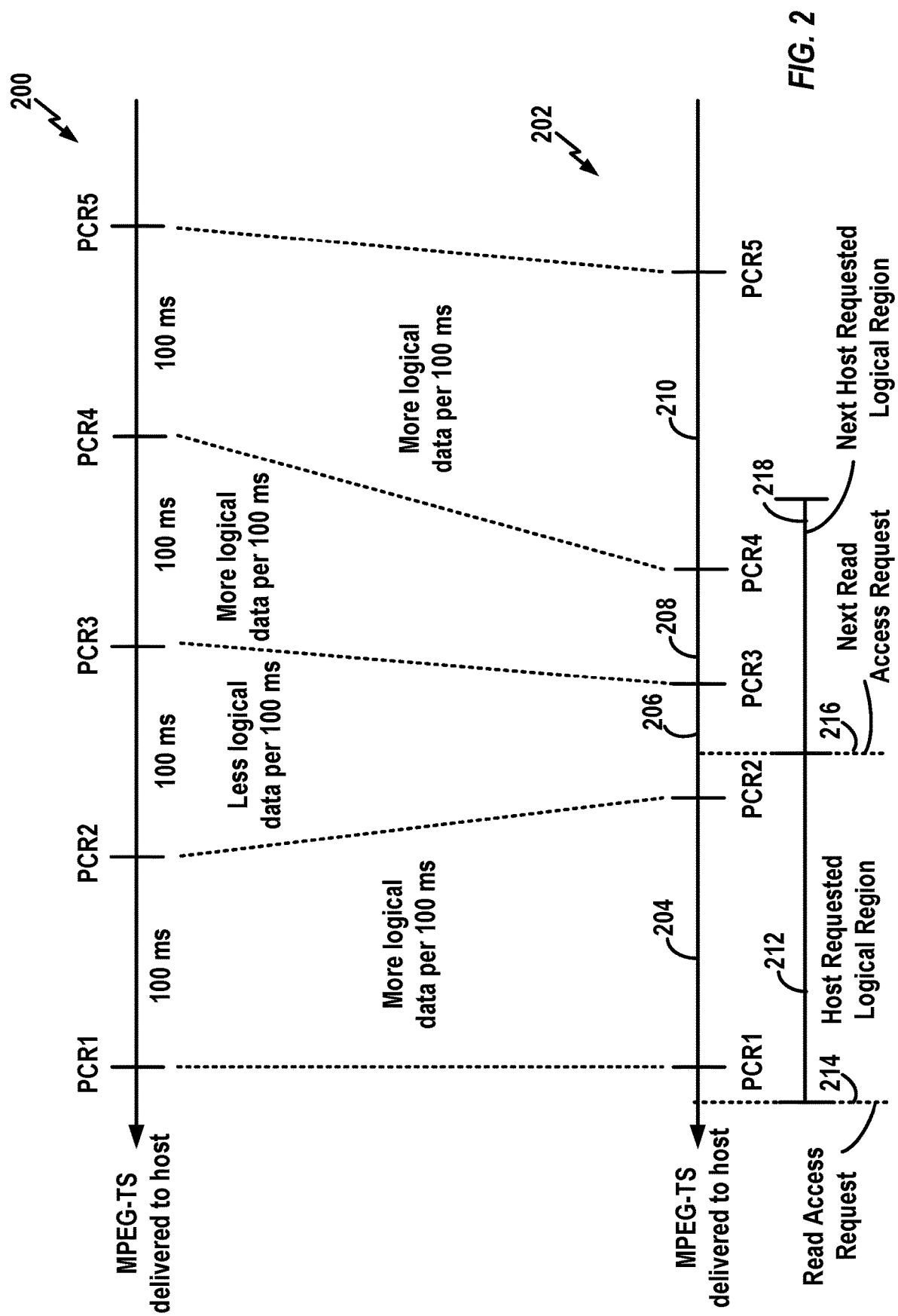
FIG. 2 is a timing diagram illustrating Program Clock Reference (PCR) indicators within an exemplary MPEG-TS data stream.

FIG. 2 provides a timing diagram 200 illustrating a sequence of PCRs (e.g. PCR1, PCR2, PCR3, etc.) within an MPEG-TS of audio and/or video data delivered to a host. As shown, the PCRs are uniformly spaced in time by 100 ms. (Note that, per MPEG standards, PCRs appear at least once every 100 ms. In practice, the temporal spacing between the PCRs may depend on the frequency of the PCRs, which for current versions of MPEG-TS is 27 MHz or 90 KHz. A value of 100 ms is used herein as a round number example. Since the data is VBR data, the amount of logical data requested by the host to transfer as part of the MPEG data stream may vary from one PCR interval to the next, as shown by timing diagram 202. (Herein, "logical data" refers to data corresponding to a logical region of a memory space, such as the data corresponding to a range of logical block addresses (LBAs).)

Timing diagram 202 shows the PCR's (e.g. PCR1, PCR2, etc.) spaced apart in accordance with the amount of data transferred in synchronization with the PCRs. For example, a first interval 204 corresponds to a relatively large amount of data, whereas intervals 206 and 208 correspond to a relatively smaller amounts of data. Interval 210 corresponds to a relatively large amount of data. FIG. 2 additionally illustrates a (first) host requested logical region 212 of data requested by the host in a first read access 214 to obtain a first portion the MPEG-TS data stream. In the particular example of logical region 212, the logical region encompasses a pair of PCRs (e.g. PCR1 and PCR2). That is, read request 214 from the host requested a relatively large amount of logical data within the NVM of the data storage controller that encompasses a pair of PCRs (e.g. more than 100 ms worth of audio/video playback data). In other cases, a host requested logical region of data for a particular host read request may encompass only one PCR. (In order for the host to playback the MPEG-TS data, each host requested logical region should contain at least one PCR, otherwise the host may not be able to play back the data.)

Based on the size of the host requested logical regions and the timing of the PCRs, the data storage controller predicts or estimates the logical data region associated with upcoming (future) read requests or read commands and, based on that information, the data storage controller predicts or estimates the upcoming (future) read access rate of the host. In this regard, even before a next (second) host read access request 216 is received by the DSD indicating a next (different) logical region 218, the DSD may predict the size per unit time of that next logical region (and other upcoming logical regions) and thereby predict a future estimate read access rate for the MPEG-TS VBR data. If, for any reason, the DSD is unable to predict the future host read access rate based on the information it currently has, the DSD waits until a next read request is received and then repeats the process. Note, also, that the DSD estimates the future host read access rate. In some cases, the estimate may not be correct, but erroneous estimates can be corrected based on the actual read access rates or other updated information.

Figure 3:
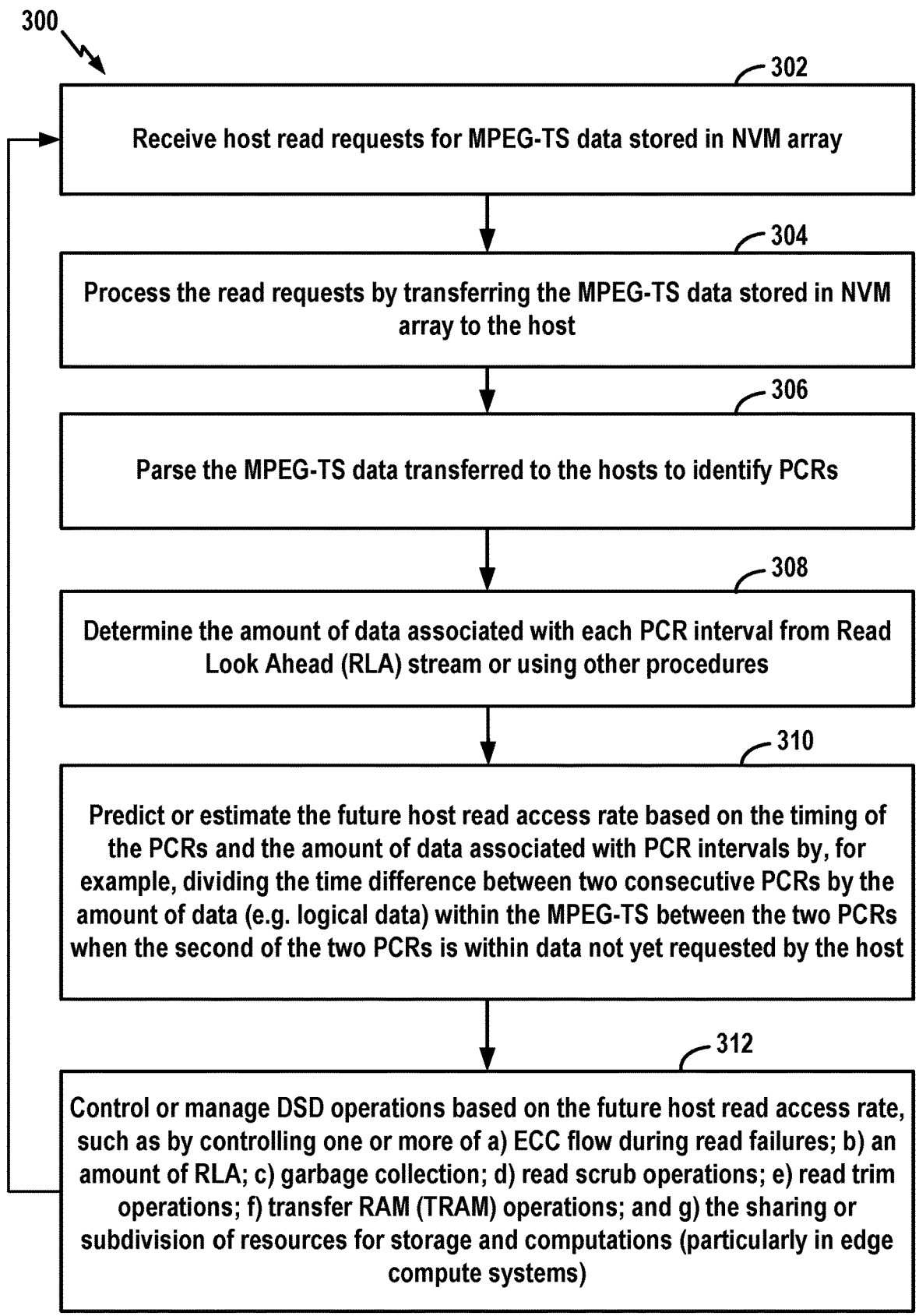
FIG. 3 is a flowchart illustrating an exemplary method that may be performed by the DSD of FIG. 1 to predict a future host access rate for a VBR MPEG-TS data stream.

FIG. 3 summarizes an exemplary prediction procedure 300 that may be performed by a DSD, such as the DSD of FIG. 1. At block 302, the DSD receives host read requests for MPEG-TS data stored in NVM array and, at block 304, the DSD processes the read requests by transferring MPEG-TS data stored in NVM array to the host. At block 306, as the MPEG-TS data is transferred, the DSD parses the MPEG-TS data transferred to the hosts to identify the PCRs within the data stream. By parse, it is meant that the DSD analyzes, examines, decodes, inspects, unpacks, or otherwise processes the data stream to locate, find, identify, obtain, read out or extract the PCRs. At block 308, the DSD determines the amount of logical data associated with each PCR interval from an RLA stream or using other procedures.

At block 310, the DSD predicts or estimates the future host read access rate based on the timing of the PCRs and on the amount of data associated with PCR intervals. For example, the amount of data (e.g. logical data) between two consecutive PCRs is divided by the time difference between the PCRs and the resulting value may be used as an estimate of the future storage host data read access rate when the second of the two PCRs is within data not yet requested by the host. In a simple illustrative example where the PCRs are 100 ms apart, a first host read request may request transference of an amount of VBR data corresponding to 1 megabytes (MB) as determined based on the LBA range of the read request. If a next (second) host read request is also expected to request transference of an equal amount of VBR data (e.g. another 1 MB), as predicted using RLA, then the predicted future host access rate is 1 MB/100 ms=10 MB/second. In a more complicated example, the DSD may take into account the position of a PCR within the LBA range of data requested by the host in a first host read request, then predict the position of the next PCR within the expected LBA range of a next (second) host read request. The DSD then computes the amount of logical data between the PCRs to estimate the future host access rate. In addition to RLA, hints derived from metadata in a read request may be used to predict the LBA ranges for read requests not yet received from the host.

At block 312, the DSD controls one of more operations based on the estimated future host read access rate such as controlling one or more of a) error correction code (ECC) flow during read failures; b) an amount of RLA; c) garbage collection operations; d) read scrub operations; e) read trim operations; f) transfer RAM (TRAM) operations; and g) the sharing or subdivision of resources for storage and computations, as may be particularly appropriate for edge compute systems. Edge computing refers to distributed computing topologies that locate computation and data storage closer to where it is needed to improve response times and save bandwidth (rather than relying on a centralized location of servers or the like).

Thus, at block 312, the DSD may utilize the future data access rate of the host (which is based on its playback application speed via the PCRs) to modify or optimize NVM storage, such as controlling background (overhead) work, deciding an amount of RLA data to use when managing its cache(s), determining ECC flow during read failures according to latency without impacting overall system throughput, or controlling other functions and parameters.

ECC flow refers to a particular processing flow or algorithm to use following detection of read errors. For example, one flow may specify that the errors should be both detected and corrected. Another might deem the errors acceptable and pass the data on to the host. The choice may depend on how much processing bandwidth is available by the DSD at any given time. Hence, if the predicted read access rate is high, the DSD may choose a relatively fast and simple ECC flow. If the predicted read access rate is low, the DSD may choose a relatively more complex and thorough ECC flow. As a more specific example, if the predicted host read access rate is extremely fast, the DSD may opt for a fast fail, rather than taking more complex ECC paths (which would throttle overall system performance). Moreover, predicting the host access rate ahead of time also allows the DSD to determine the available time for recovering from a NAND read failure and hence can be used to select a modified ECC recovery flow (i.e. controller flow for read error handling) according to the evaluated time available at any given time.

The amount of RLA generally refers to how far ahead the RLA looks to predict upcoming reads (and hence affects the amount of cache that is consumed). If the predicted read access rate is high, the DSD may throttle back RLA, and increase RLA if the predicted read access rate is high. Garbage collection refers to a background process by which good (valid) information stored in the NVM array is copied from blocks which are marked as stale and thus slated to be wiped and written to fresh (unused blocks). Garbage collection searches for blocks that contain a mix of good and stale pages and then duplicates only the good pages into new blocks and erases the old block and marks it ready for use. If the predicted read access rate is high, the DSD may choose to devote less processing bandwidth to garbage collection (or suspend garbage collection entirely until read access rates are lower). If the predicted read access rate is low, the DSD may choose to devote a relatively larger amount of bandwidth to garbage collection (and reactivate garbage collection if currently suspended).

Read scrub refers to background procedures for reading from memory locations, correcting bit errors (if any) using ECC, and then writing the corrected data back to the same (or a different) location. If the predicted read access rate is high, the DSD may choose to devote less processing bandwidth to read scrub (or suspend read scrub entirely until read access rates are lower). If the predicted read access rate is low, the DSD may choose to devote a relatively larger amount of bandwidth to read scrub (and reactivate it if currently suspended). Read trim refers to operations to adjust read trim settings for the memory die in which the VBR data is stored such as a read thresholds and read threshold calibration control parameters. Read threshold calibration is a procedure (often performed periodically) to adjust or calibrate read thresholds. If the predicted read access rate is high, the DSD may choose to devote less bandwidth to read threshold calibration (or suspend read calibration entirely until read access rates are lower). If the predicted read access rate is low, the DSD may choose to devote a relatively larger amount of bandwidth to read threshold calibration (and reactivate it if currently suspended). Moreover, the DSD can utilize periods of time when the read access rate is expected to be low to provide increased latency read trim to perform NVM access with a lower resulting BER. Note that for NANDs, the advantages gained using the technique may increase as NAND blocks age and/or its cells weaken. Transfer RAM (TRAM) operations relate to transfer read cache management operations. For example, if the host access rate is predicted to decrease, a TRAM cache connected to the host for data access (i.e. a data path cache) may be released for control tables to complete pending background work.

Following block 312, processing returns to block 302 to process additional host requests to update the predicted read access rate.

Figure 4:
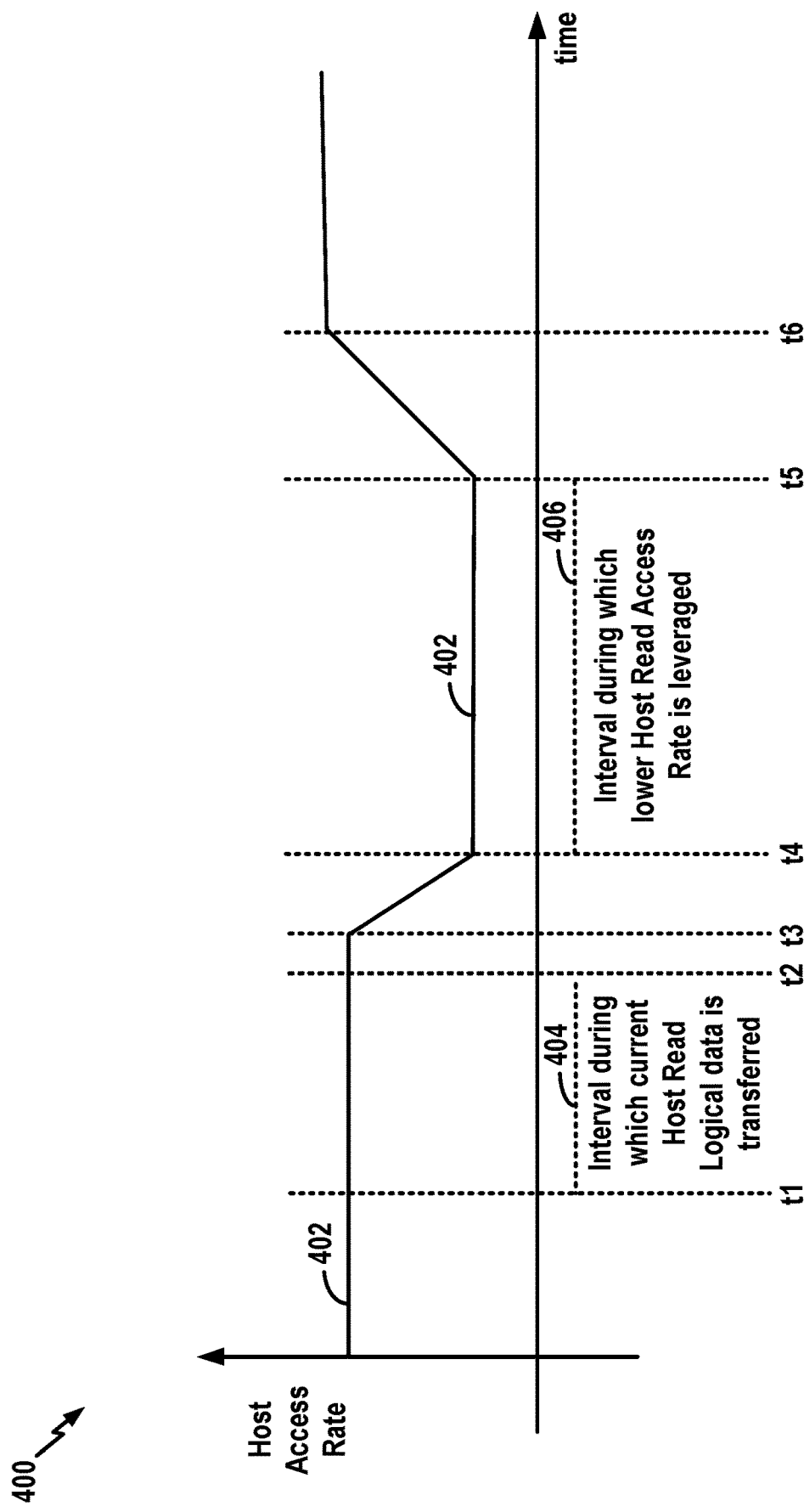
FIG. 4 is a timing diagram illustrating an exemplary host access rate for VBR data.

FIG. 4 is a timing diagram 400 illustrating a host read access rate 402 that varies over time and particularly illustrating an interval during which a reduced read access rate may be leveraged or otherwise exploited. A current host read logical data interval 404 begins in this example at time t1 and ends at time t2 during which the host access rate 402 relatively high. During interval 404, the DSD predicts a future host read access rate (block 310 of FIG. 3) based on the duration (size) of the current host read logical data region and the timing of the PCRs (not shown in FIG. 4). In this example, the prediction indicates that the host read access rate with decrease following time t3 to a lower rate. An interval 406 from time t4 to time t5 represents a period during which the lower host read access rate may be leveraged or exploited by the DSD by selectively controlling the various operations of block 312 of FIG. 3 to achieve performance enhancements or other goals. Notably, depending upon the particular function, the adjustments to the operations of block 312 of FIG. 3 may begin before interval 406 is reached. That is, the DSD may begin to adjust its operations even before the read access rate begins to decrease (at time t3) based on the prediction that it will decrease. Still further, once the DSD has predicted the subsequent increase in host read access rate (which begins at t5), the DSD may begin to adjust its operations even before the read access rate begins to increase (at time t5) based on the prediction that it will increase. This may allow to the DSD to perform operation and functions (such as garbage collection) during interval 406 (when the DSD has more time to perform such functions) before the rate the subsequently increases.

NVMe-based examples will now be described.

Exemplary NVMe Embodiments

Figure 5:
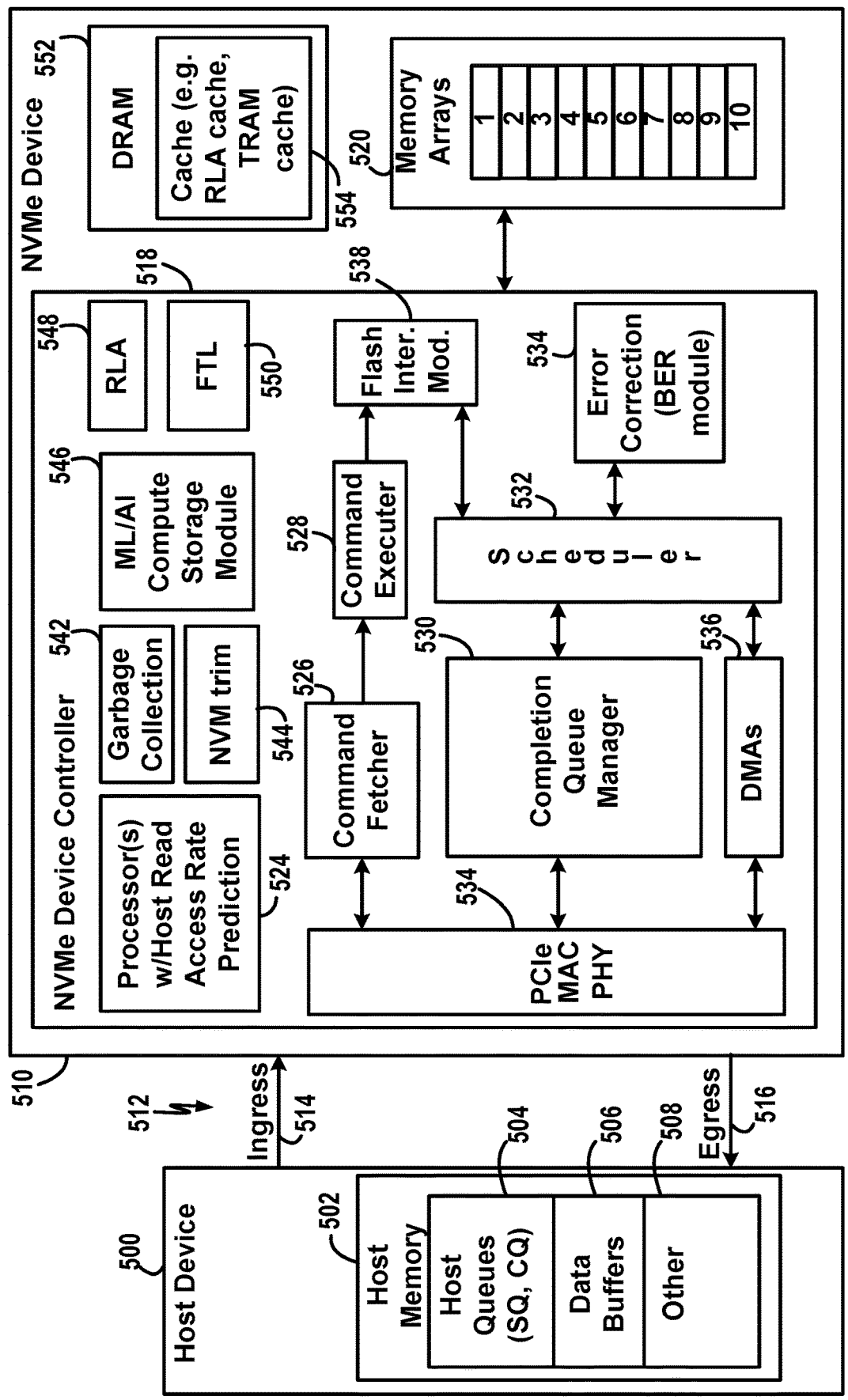
FIG. 5 is a schematic block diagram illustrating an exemplary system with a Non-Volatile Memory express (NVMe) device controller configured to predict a future host access rate for a VBR MPEG-TS data stream and control data processing based on the rate.

FIG. 5 illustrates certain features of an exemplary NVMe architecture in which the systems and procedures for predicting an estimated host read access rate for MPEG-TS VBR data or for other data streams of VBR data may be implemented.

In FIG. 5, a host device 500 may be any suitable computing or processing platform capable of accessing memory on an NVM data storage device to retrieve MPEG data using NVMe procedures. The host device 500 includes internal memory 502, which in this example is dynamic random access memory (DRAM). The host memory 502 may be configured to include, as shown, various host submission queues (SQs) and completion queues (CQs) 504, data buffers 506 and other memory components 508. The host device 500 may store MPEG data and other data in an NVMe storage device 510. The NVMe device 510 may be any suitable device that provides non-volatile memory storage for host device 500 in accordance with NVMe standards. For example, the NVMe device 510 may be a removable storage device, such as a flash SSD that is removably connectable to host device 500. In another example, the NVMe device 510 may be non-removable or integrated within the host device 500. In some embodiments, the host device 500 and the NVMe device 510 are communicatively connected via a PCIe bus 512 (including ingress 514 and egress 516).

The NVMe storage device 510 of FIG. 5 includes an NVMe controller 518 and a non-volatile memory 520. The NVMe controller 518 controls access to the non-volatile memory 520 such as a NAND. The NVMe controller 518 thus may be a non-volatile memory controller that implements or supports the NVMe protocol, and non-volatile memory 520 may be 2D or 3D NAND flash memory. The NVMe controller includes one or more processors 524 configured to predict the estimated host read access rate for MPEG-TS VBR data or for other transport streams of VBR data. The processor(s) 524 are also responsible for the execution of other Frond-End and Back-End tasks.

In use, a command fetcher 526 of the NVMe controller 518 fetches commands, such as read requests for MPEG data, from the submission queues within the host memory 502 and forwards the commands to a command executer 528. The command fetcher 526 is responsible for fetching and parsing the commands from the host and queuing them internally and may form part of a front end of the NVMe controller 518. The command executer 528 is responsible for the arbitrating and executing the commands. Upon completion of the commands, the NVMe controller 518 generates completion entries that are ultimately directed to the completion queues within the host memory 502. A completion queue manager 530 is responsible for managing the host completion queues. Among other functions, the completion queue manager 530 routes completion entries received from a scheduler 532 to a completion queue within the host device 500 via a PCIe MAC PHY interface 534.

Actual streams of MPEG data (obtained as the result of read commands applied to the NVM memory arrays 520) are delivered to the host device 500 using one or more DMAs 536. Additional components of the NVMe controller 518 shown in FIG. 5 include a flash interface module (FIM) 538, which is responsible for controlling and accessing the memory arrays 520, and an ECC component 540, which includes a bit error rate (BER) module.

Additional components of the NVMe controller 518 include: a garbage collection module 542 for controlling garbage collection and related tasks; an NVM trim module 544 for controlling NAND trim operations and related tasks such as read threshold calibration; a machine learning (ML)/artificial intelligence (AI) compute storage module 546; an RLA controller 548; and an FTL 550. Note that some of these components may be part of the flash interface module 538 but are shown separately for the sake of completeness and convenience. The NVMe storage device 510 may additionally include a DRAM 552 (or other working memory), which may include a cache 554, which may include portions devoted to RLA caching or TRAM caching.

Figure 6:
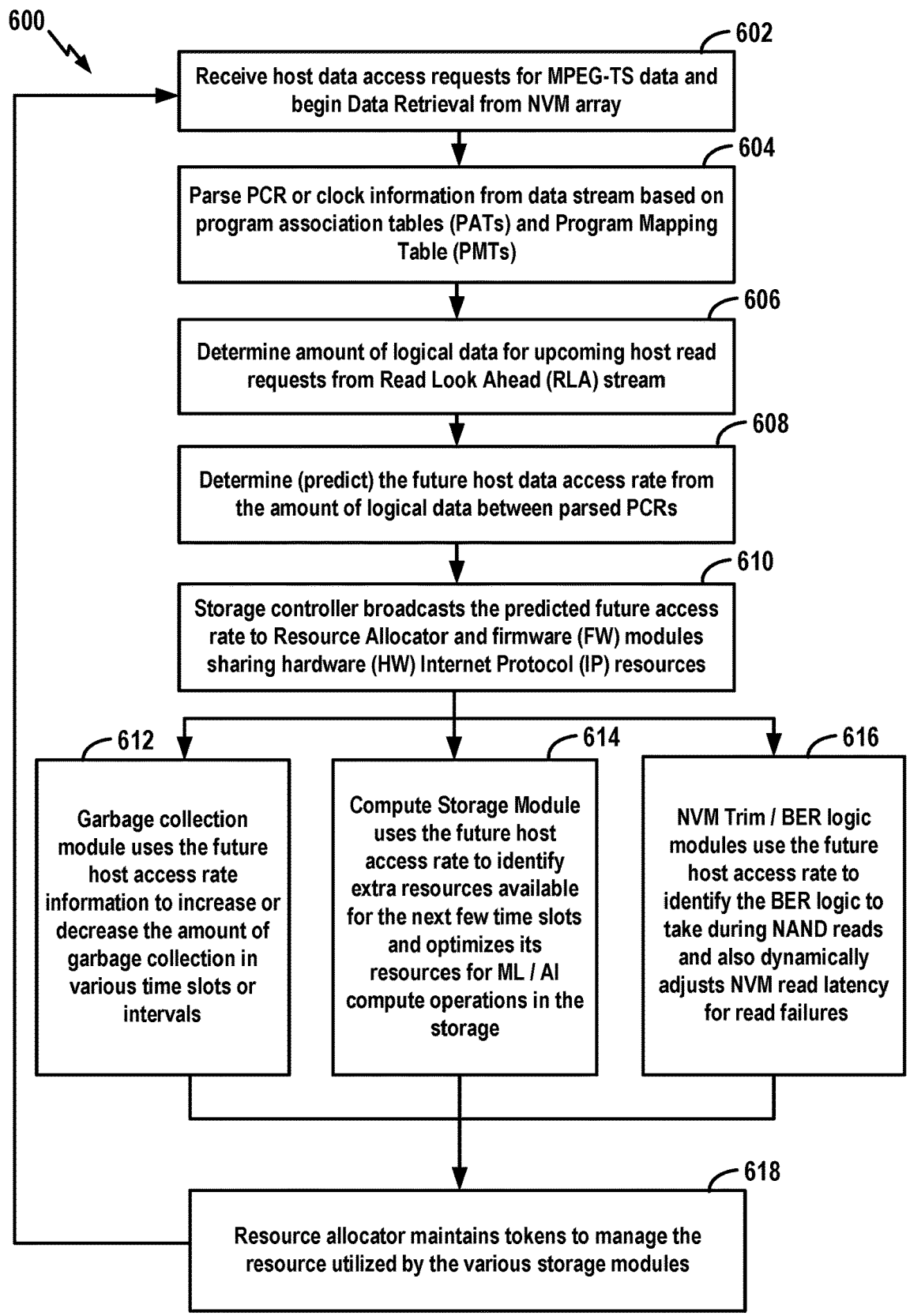
FIG. 6 is a flowchart illustrating an exemplary method that may be performed by the NVMe device of FIG. 5 to predict a future host access rate for a VBR MPEG-TS data stream and control data processing based on the rate.

FIG. 6 illustrates a prediction procedure 600 that may be performed by the NVMe data storage device 510 of FIG. 5 or other suitably-equipped devices. At block 602, the DSD receives host data access requests for MPEG-TS data (from the submission queues within the host memory 502) and begins data retrieval from the NVM array (e.g. memory arrays 520). In an NVMe-based system, host read requests may be received via the PCIe/MAC/PHY frontend component of the DSD where the request indicates the LBA ranges of the MPEG data to be retrieved from the NVM array. In one example, the read request includes the initial LBA for a region of MPEG data and the size of the logical region of data. The DSD forwards the information to the FTL to obtain the physical block addresses (PBAs) for the data within the NVM array for retrieval. The data is then retrieved from the NVM array and sent to the host via the DMAs for storage within a buffers within host memory with completion entries posted in the completion queues of the host memory to notify the host.

At 604, DSD parses PCRs (or other clock synchronization values) from MPEG-TS data stream (obtained by the flash interface module 538). Parsing of PCRs may be achieved by examining the MPEG transport stream of data to identify PCR packet identifiers (PCR PIDs). This may be facilitated by identifying the PAT program association tables (PATs) and subsequent Program Mapping Table (PMTs). The PAT lists all programs available in a particular transport stream. Each of the programs listed in the PAT has an associated value of PID for its PMT. The PMT provides program map (PM) specific data and contains information about programs, such as television programs or videos. For each program, there is usually one PMT and the PMT provides information on each program present in the transport stream. The PMT includes the PID that contains the PCR.

Note that, since MPEG transport streams are meant for broadcast purposes, an MPEG sync byte is available quite often (where the sync byte differs from the PCR and is usually the first byte of an MPEG-TS packet header). Locking MPEG control portions of the DSD to a known MPEG sync, identifying the PAT, followed by the PMT thus can be used to find the corresponding PCR value. Note also that with streams having more than one program (as with broadcast streams), it is sufficient to lock to one of the program PCRs. In this case, the logical data between two PCRs corresponds to all the programs together. Since the DSD operates to estimate the effective host access rate, locking to any one of the PCRs of the MPEG-TS serves the same purpose. In some cases of MPEG-TS, there may be just a single set of PCRs for a batch of programs and that single set of PCRs is sufficient for A/V sync purposes.

In some examples, during data writes (i.e. when the MPEG data is initially stored in the NVM), the LBAs of the PCR PIDs may be found and internally marked by the DSD (along with, e.g., other control structure updates) to enable the DSD to leverage the marked information during a subsequent read access of the MPEG data. This may be done to facilitate locating the PCR PIDs during read access and to more readily identify the amount of logical data between PCRs. In short, this is a means for marking the data rate locally during writes so that it is easier to exploit this information during reads.

At block 606, the DSD determines amount of logical data for upcoming read requests from an RLA stream using processor 524 and RLA component 548. Note that a RLA is a type of data pre-fetch for anticipating a next command that will be received from the host to reduce the turn-around times for a sequence of commands (such as a sequence of MPEG read access requests). The RLA may include a speculative read from the NVM array when predicting the LBA range for the next command from the host. Predicting the next command via RLA may be performed by a firmware (FW) or hardware (HW) procedure that considers sequences of data or other methods of predicting commands. The RLA may store the look ahead data in a cache (which may comprise a set of latches) before a request is actually made by the host for the data. In some examples, when the host requests data having a particular LBA range, additional data having an LBA range that is sequential to the requested data may be stored in the latches. Because a host may frequently request data that is logically sequential to the last requested data, especially for MPEG-TS, there is a higher probability the stored data will be requested. RLA data for storage in the cache may also be selected based on other host data usage patterns. At block 606, the DSD thus may use LBA information generated by the RLA module to determine the amount of logical data for an MPEG read request that has not yet been received from the host (e.g. a read request that will retrieve data with a next consecutive PCR). Additionally, or alternatively, hints within metadata may be exploited for this purpose.

At block 608, the DSD determines (predicts) the future host data access rate from the amount of logical data between a pair of parsed PCRs, such as the PCR for a current read request where the size of the requested LBA region is known and the PCR for a next read request where the size of the requested LBA region is not yet known. In this regard, with MPEG-TS VBR data, it may be assumed that the host will fetch the data at a rate according to its playback requirements. Even assuming the host playback system has its own cache (and that cache might be very large), the MPEG data access rate will subsequently correspond to the encoded VBR. Hence, when the DSD can predict the host access rate ahead of time, the host can afford to have non-stringent data buffering to access the MPEG data while playback.

For example, at block 608, back to back PCRs (identified at block 604) and the distance between the PCRs in terms of logical data and absolute time is evaluated. As already noted, the PCRs are spaced equally in time and the logical data is either known or can be predicted from RLA. In an illustrative example, at least one of the PCRs is within the logical data not yet requested by host (as shown by PCR3 in FIG. 2). As noted, with VBR encoding, the amount of logical data between two consecutive PCRs may vary greatly according to the amount of information in the encoded stream. In slots of the MPEG-TS where the VBR data is less, the data access rate by host for that time window is also less (given the playback requirements of the host applications, e.g. playback to a user).

To summarize the operations of blocks 602-608, upon a host read request, the data is accessed from the NVM array by the DSD and the data is parsed first for the MPEG-TS, then for its PCR according to MPEG specifications. Assuming the DSD is configured for RLA, the DSD also fetches the next portion of logical data to its cache (i.e. a portion not yet requested by host). Back to back PCRs are identified and the "distance" between them in terms of logical data and absolute time is detected or otherwise evaluated. The DSD then predicts or estimates the future host data rate, as already explained. One reason why the procedure is capable of predicting the actual read access rate for upcoming VBR data (rather than just predicting upcoming LBA ranges for read requests) is that the DSD is retrieving an MPEG VBR transport stream of audio/video data, which the host will playback in sync with the PCRs and so the host cannot retrieve the data at random or while using arbitrary read access rates.

At block 610, the data storage controller of the DSD "broadcasts" the predicted future read access rate to Resource Allocator and to FW modules sharing HW Internet Protocol (IP) resources within the DSD, i.e. the data storage controller relays the future read access rate to those components so that the information can be exploited or leveraged.

At block 612, a garbage collection module of the DSD (such as module 542) uses the future host access rate information to increase or decrease the amount of garbage collection in various time slots or intervals, in accordance with techniques discussed above. At block 614, a ML/AI compute storage module of the DSD (such as module 546) uses the future host access rate to identify extra resources available for the next few time slots and optimizes its resources for ML/AI compute operations in the storage device. For example, if the DSD is configured to perform image recognition functions (or other ML/AI operations) on the MPEG data as the data is retrieved, those functions may be controlled based on the read access rate to devote more resources to the ML/AI functions when the rate is expected to be low and to device fewer resources to the ML/AI functions when the rate is expected to be high. At block 616, NVM Trim/BER logic modules (such as modules 542 and 534 of FIG. 5) use the future host access rate to identify the BER (ECC) logic to take during NVM reads and also dynamically adjusts NVM (e.g. NAND) read latency for read failures.

At block 618, a resource allocator of the DSD maintains tokens to manage the resources utilized by the various storage modules of blocks 612, 614 and 616, then processing returns to block 602 to retrieve and process more MPEG-TS data. The operations of blocks 602-618 may be repeated until the MPEG-TS transfer is complete (e.g. until a particular video has reached its ends) or until the host terminates the transfer. As noted, an MPEG transport stream may include multiple channels and the same PCRs may be parsed for those channels.

In the following, various general exemplary procedures and systems are described.

Additional Exemplary Methods and Apparatus

Figure 7:
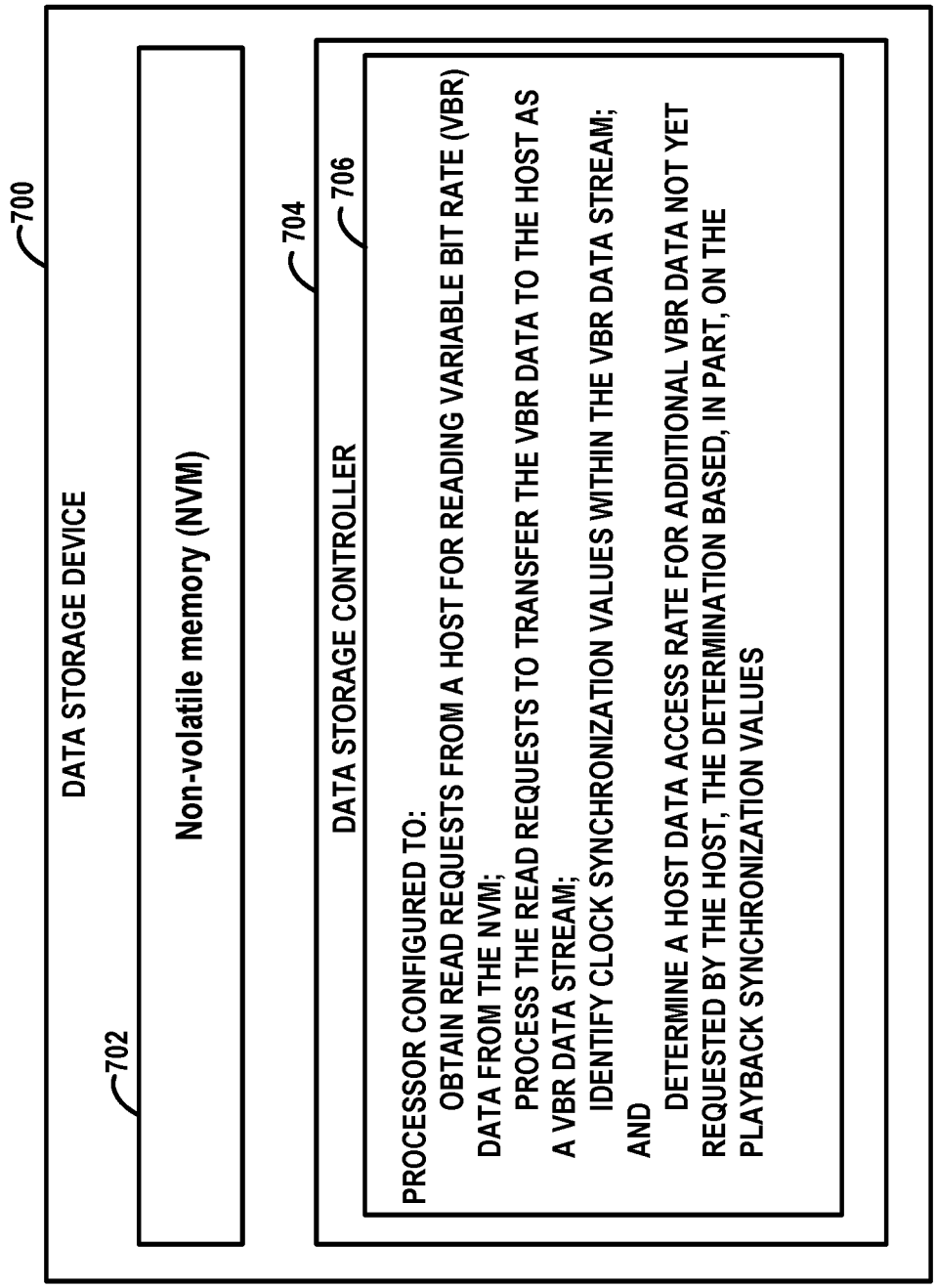
FIG. 7 is a schematic block diagram illustrating an exemplary data storage device configured in accordance with aspects of the disclosure.

FIG. 7 broadly illustrates a data storage device 700 configured according to one or more aspects of the disclosure. The data storage device 700 includes an NVM 702 and a data storage controller 704. The data storage controller 704 includes a processor or processing circuit 706 configured to: obtain read requests from a host for VBR data (e.g. MPEG-TS data) from the NVM; process the read requests to transfer the VBR data to the host as a VBR data stream; identify clock synchronization values (e.g. PCRs) within the VBR data stream; and determine a host data access rate for additional VBR data not yet requested by the host, the determination based, in part, on the clock synchronization values. The processor may additionally be configured to control at least one DSD operation based on the host data access rate, such as by controlling one or more of: a) ECC flow during a read failure; b) an amount of RLA used for cache operations; c) garbage collection operations; d) read scrub operations; e) read trim operations; f) TRAM operations; and g) the sharing or subdivision of resources for storage and computations.

Figure 8:
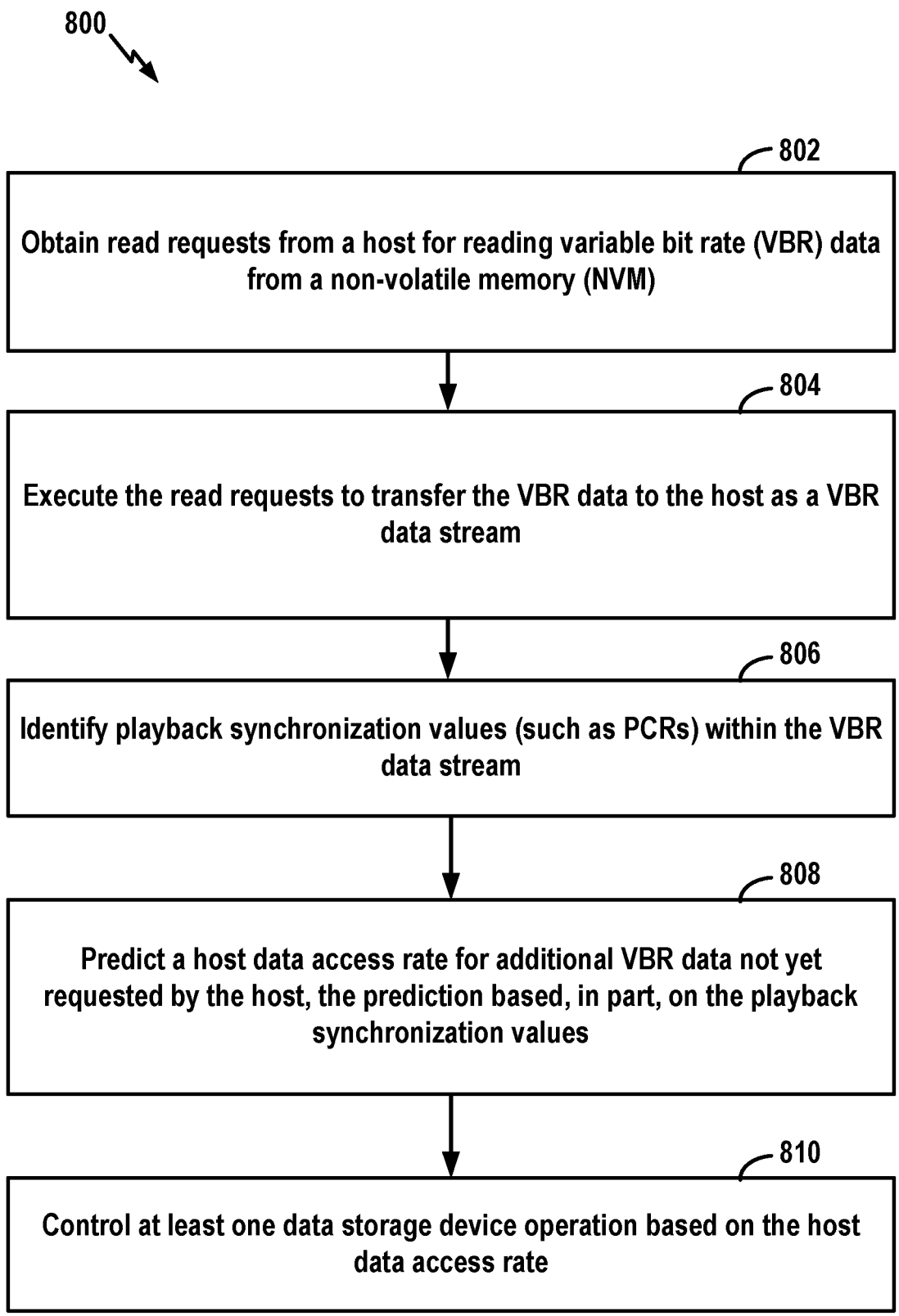
FIG. 8 is a flowchart that summarizes exemplary operations performed by a data storage device configured in accordance with aspects of the disclosure.

FIG. 8 broadly illustrates a process 800 in accordance with aspects of the disclosure. The process 800 may take place within any suitable DSD having an NVM. At block 802, the DSD obtains read requests from a host for reading VBR data (e.g. MPEG-TS data) from an NVM. At block 804, the DSD executes the read requests to transfer the VBR data to the host as a VBR data stream. At block 806, the DSD parses the VBR data stream to identify clock synchronization values (such as PCRs) within the VBR data stream. At block 808, the DSD predicts (e.g. estimates) a host data access rate for additional VBR data not yet requested by the host, the prediction based, in part, on the clock synchronization values. At block 810, the DSD controls at least one data storage device operation based on the host data access rate, such as by controlling one or more of: a) ECC flow during a read failure; b) an amount of RLA used for cache operations; c) garbage collection operations; d) read scrub operations; e) read trim operations; f) TRAM operations; and g) the sharing or subdivision of resources for storage and computations.

Figure 9:
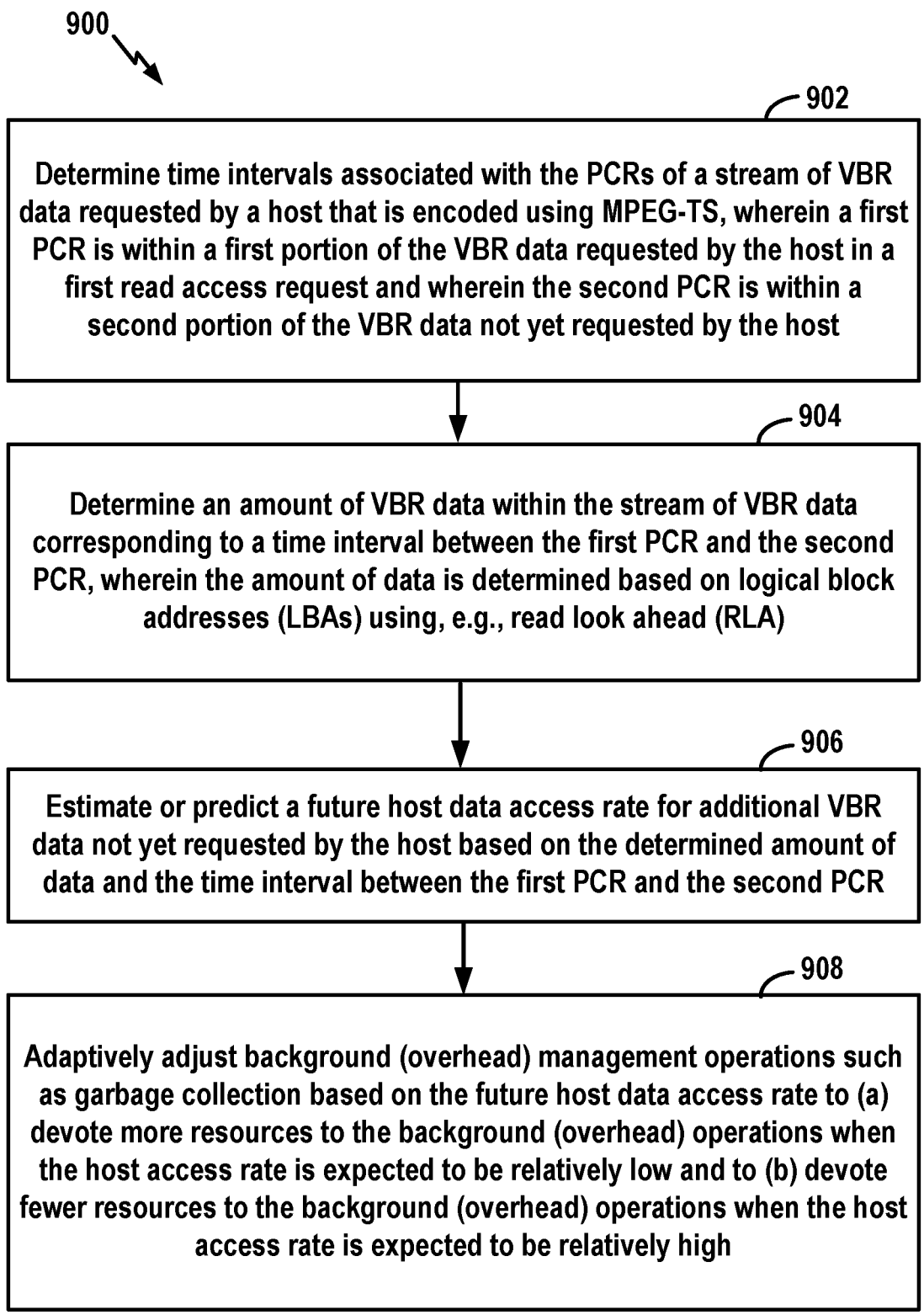
FIG. 9 is another flowchart that summarizes exemplary operations performed by a data storage device configured in accordance with some aspects of the disclosure.

FIG. 9 broadly illustrates a process 900 in accordance with aspects of the disclosure. The process 900 may take place within any suitable DSD having an NVM such as the DSDs of FIGS. 1, 5, 8, and 10. At block 902, the DSD determines time intervals associated with the PCRs of a stream of VBR data requested by a host that is encoded using MPEG-TS, wherein a first PCR is within a first portion of the VBR data requested by the host in a first read access request and wherein the second PCR is within a second portion of the VBR data not yet requested by the host. At block 904, the DSD determines an amount of VBR data within the stream of VBR data corresponding to a time interval between the first PCR and the second PCR, wherein the amount of data is determined based on LBAs using RLA. At block 906, the DSD estimates or predicts a future host data access rate for additional VBR data not yet requested by the host based on the determined amount of data and the time interval between the first PCR and the second PCR. At block 908, the DSD adaptively adjusts background (overhead) management operations such as garbage collection based on the future host data access rate to (a) devote more resources to the background (overhead) operations when the host access rate is expected to be relatively low and to (b) devote fewer resources to the background (overhead) operations when the host access rate is expected to be relatively high. See, for example, the exemplary background (overhead) operations discussed above with reference to FIGS. 3 and 6.

Figure 10:
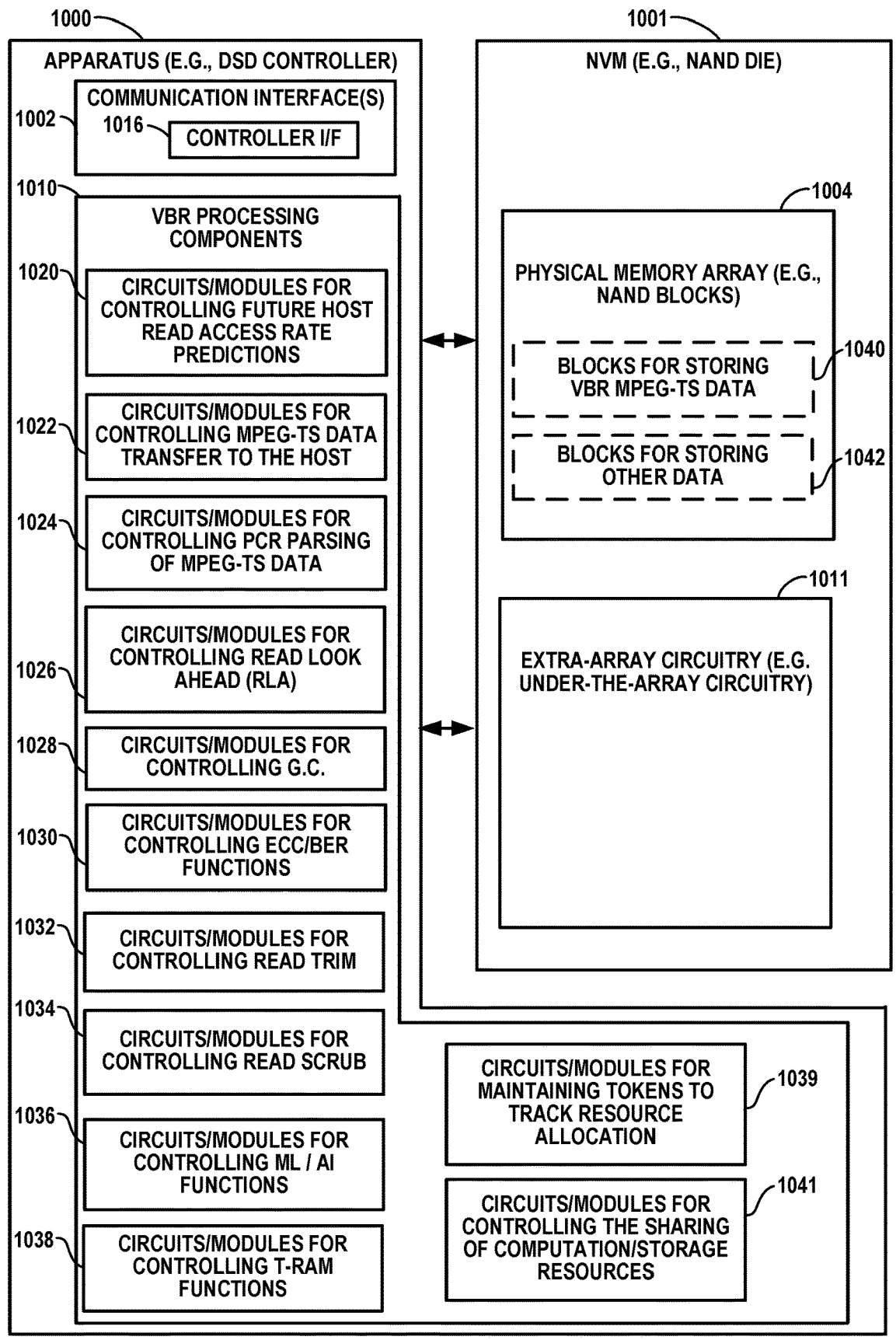
FIG. 10 is a schematic block diagram configuration for an exemplary die and storage controller configured in accordance with some aspects of the disclosure.

FIG. 10 illustrates an embodiment of an apparatus 1000 configured according to one or more aspects of the disclosure. The apparatus 1000, or components thereof, could embody or be implemented within a data storage controller such as a DSD controller coupled to a NAND die or some other type of NVM array that supports data storage. In various implementations, the apparatus 1000, or components thereof, could be a component of a processor, a controller, a computing device, a personal computer, a portable device, or workstation, a server, a personal digital assistant, a digital camera, a digital phone, an entertainment device, a medical device, a self-driving vehicle control device, an edge device, or any other electronic device that stores, processes or uses neural data.

The apparatus 1000 includes a communication interface 1002 and is coupled to a NVM 1001 (e.g. a NAND die). The NVM 1001 includes physical memory array 1004 and extra-array processing circuits 1011 (e.g. under-the-array or next-to-the-array circuits). These components can be coupled to and/or placed in electrical communication with one another via suitable components, represented generally by the connection line in FIG. 10. Although not shown, other circuits such as timing sources, peripherals, voltage regulators, and power management circuits may be provided, which will not be described any further.

The communication interface 1002 of the apparatus 1000 provides a means for communicating with other apparatuses over a transmission medium. In some implementations, the communication interface 1002 includes circuitry and/or programming (e.g., a program) adapted to facilitate the communication of information bi-directionally with respect to one or more devices in a system. In some implementations, the communication interface 1002 may be configured for wire-based communication. For example, the communication interface 1002 could be a bus interface, a send/receive interface, or some other type of signal interface including circuitry for outputting and/or obtaining signals (e.g., outputting signal from and/or receiving signals into a DSD).

The physical memory array 1004 may include one or more NAND blocks. The physical memory array 1004 may be coupled to the circuits 1011 such that the circuits 1011 and/or components of the apparatus 1000 and can read or sense information from, and write or program information to, the physical memory array 1004. That is, the physical memory array 1004 can be coupled to the circuits 1011 and/or components of the apparatus 1000 so that the physical memory array 1004 is accessible by the circuits 1011 and/or components of the apparatus 1000. For instance, in some examples, the circuits 1011 may be on-chip circuits for assessing BER.

The apparatus 1000 includes various VBR processing components 1010 arranged or configured to obtain, process and/or send data, control data access and storage, issue or respond to commands, and control other desired operations. For example, the components 1010 may be implemented as one or more processors, one or more controllers, and/or other structures configured to perform functions. According to one or more aspects of the disclosure, the components 1010 may be adapted to perform any or all of the features, processes, functions, operations and/or routines described herein. For example, the components 1010 may be configured to perform any of the steps, functions, and/or processes described with respect to FIGS. 1-9. As used herein, the term "adapted" in relation to components 1010 may refer to the components being one or more of configured, employed, implemented, and/or programmed to perform a particular process, function, operation and/or routine according to various features described herein. The circuits may include a specialized processor, such as an ASIC that serves as a means for (e.g., structure for) carrying out any one of the operations described, e.g., in conjunction with FIGS. 1-9. The components 1010 serve as an example of a means for processing. In various implementations, the components 1010 may provide and/or incorporate, at least in part, functionality described above for the components 1610 of FIG. 16.

According to at least one example of the apparatus 1000, the VBR processing components 1010 may include one or more of: circuit/modules 1020 configured for controlling future host read access rate predictions; circuits/modules 1022 configured for controlling MPEG-TS data transfer to the host; circuits/modules 1024 configured for controlling PCR parsing of the MPEG-TS data; circuits/modules 1026 configured for controlling RLA; circuits/modules 1028 configured for controlling garbage collection; circuits/modules 1030 configured for controlling ECC/BER functions; circuits/modules 1032 configured for controlling read trim; circuits/modules 1034 configured for controlling read scrub; circuits/modules 1036 configured for controlling ML/AI functions; circuits/modules 1038 configured for controlling TRAM functions; circuits/modules 1039 configured for maintaining tokens to track resource allocation; and circuits/modules 1041 configured for controlling the sharing of computation/storage resources.

The physical memory array 1004 may include one or more of: blocks 1040 for storing VBR MPEG-TS audio and/or video data or other types of VBR data; and blocks 1042 for storing other data such as other user data.

In at least some examples, means may be provided for performing the functions illustrated in FIG. 10 and/or other functions illustrated or described herein. For example, the means may include one or more of: means, such as circuit/module 1020, for controlling future host read access rate predictions; means, such as circuits/modules 1022, configured for controlling MPEG-TS data transfer to the host; means, such as circuits/modules 1024, for controlling PCR parsing of the MPEG-TS data; means, such as circuits/modules 1026, for controlling RLA; means, such as circuits/modules 1028, for controlling garbage collection; circuits/modules 1030 configured for controlling ECC/BER functions; means, such as circuits/modules 1032, for controlling read trim; means, such as circuits/modules 1034, for controlling read scrub; means, such as circuits/modules 1036, for controlling ML/AI functions; circuits/modules 1038 configured for controlling TRAM functions; means, such as circuits/modules 1039, for maintaining tokens to track resource allocation; and means, such as circuits/modules 1041, for controlling the sharing of computation/storage resources.

Additional Aspects

At least some of the processing circuits described herein may be generally adapted for processing, including the execution of programming code stored on a storage medium. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein may be arranged to obtain, process and/or send data, control data access and storage, issue commands, and control other desired operations. The processing circuits may include circuitry configured to implement desired programming provided by appropriate media in at least one example. For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. At least some of the processing circuits may also be implemented as a combination of computing components, such as a combination of a controller and a microprocessor, a number of microprocessors, one or more microprocessors in conjunction with an ASIC and a microprocessor, or any other number of varying configurations. The various examples of processing circuits noted herein are for illustration and other suitable configurations within the scope of the disclosure are also contemplated.

Aspects of the subject matter described herein can be implemented in any suitable NVM, including NAND flash memory such as 3D NAND flash memory. More generally, semiconductor memory devices include working memory devices, such as DRAM or SRAM devices, NVM devices, ReRAM, EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two dimensional memory structure or a three-dimensional memory structure.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two-dimensional and three-dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," an variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" or "one or more of A, B, or C" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" or "one or more of A, B, or C" is intended to cover A, B, C, A-B, A-C, B-C, and A-B-C, as well as multiples of the same members (e.g., any lists that include AA, BB, or CC) Likewise, "at least one of: A, B, and C" or "one or more of A, B, or C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage device, comprising:
 a non-volatile memory (NVM); and
 a data storage controller including a processor configured to:
  obtain NVM read commands from a host for reading variable bit rate (VBR) data from the NVM, each NVM read command including a logical block address (LBA);
  process the read commands to read and transfer the VBR data from the NVM to the host as a VBR data stream;
  identify clock synchronization values within the VBR data stream;
  predict a host data access rate for additional VBR data not yet requested by the host, the prediction based, in part, on the clock synchronization values and the LBAs; and
  control an NVM operation based on the predicted host data access rate;
  wherein the clock synchronization values are program clock references (PCRs) and there is at least one LBA associated with each PCR; and
  wherein the processor is further configured to predict the host data access rate for the additional VBR data not yet requested by the host based on the LBAs associated with the PCRs using a read look ahead (RLA) component of the data storage device.

2. The data storage device of claim 1, wherein the processor is configured to predict the host data access rate for the additional VBR data by:
 determining an amount of data within the VBR stream associated with a time interval between a first PCR and a second PCR of the VBR stream with the amount of data determined, in part, using the RLA; and
 estimating the host data access rate for the additional VBR data based on the amount of data and the time interval between the first PCR and the second PCR.

3. The data storage device of claim 2, wherein the first PCR is within a first portion of the VBR data requested by the host in a first read access request received by the data storage controller and wherein the second PCR is within a second portion of the VBR data not yet requested by the host and with the amount of data associated with the second PCR determined, in part, using the RLA.

4. The data storage device of claim 1, wherein the processor is further configured to control, based on the predicted host data access rate, one or more of: a) a read trim operation; b) an amount of memory used for RLA cache operations; c) transfer random access memory (TRAM) operations; d) a sharing or subdivision of resources for storage and computations; and e) error correction code (ECC) operations.

5. The data storage device of claim 1, wherein the processor is further configured to control a machine learning image recognition operation based on the predicted host data rate to devote a first amount of processing resources to the image recognition operation in response to the predicted host data rate exceeding a threshold and to devote a second, different amount of processing resources to the image recognition operation in response to the predicted host data rate not exceeding the threshold.

6. The data storage device of claim 1, wherein the processor is further configured to control a complexity level of an ECC processing flow by being configured to compare the predicted host data access rate to a threshold and select:

(a) a first ECC processing flow during intervals of time when the predicted host data access rate is below a threshold, and (b) a second, different ECC processing flow during intervals of time when the predicted host data access rate is not below the threshold, wherein the first ECC processing flow is a more complex ECC processing flow than the second ECC processing flow.

7. The data storage device of claim 6, wherein the processor is further configured to (a) select an ECC processing flow configured to only detect but not correct errors as the first ECC processing flow and to (b) select an ECC processing flow configured to both detect and correct errors as the second ECC processing flow.

8. The data storage device of claim 1, wherein the processor is further configured to:

(a) decrease an amount of processing bandwidth devoted to a read scrub background operation performed by the processor, in response to the predicted host data access rate being higher than a threshold, and (b) increase the amount of processing bandwidth devoted to the read scrub background operation, in response to the predicted host data access rate not being higher than the threshold.

9. The data storage device of claim 1, wherein the RLA component is configured to perform speculative reads from the NVM.

10. The data storage device of claim 9, wherein the NVM is a NAND-based NVM formed within a die and wherein the RLA component is configured to store data from the speculative reads within latches within the die.

11. A method for use with a data storage device comprising non-volatile memory (NVM), the method comprising:

obtaining read commands from a host for reading variable bit rate (VBR) data from the NVM, each NVM read command including a logical block address (LBA);

executing the read commands to read and transfer the VBR data from the NVM to the host as a VBR data stream;

identifying clock synchronization values within the VBR data stream;

predicting a host data access rate for additional VBR data not yet requested by the host, the prediction based, in part, on the clock synchronization values and the LBAs; and controlling an NVM operation based on the predicted host data access rate;

wherein the clock synchronization values are program clock references (PCRs) and there is at least one LBA associated with each PCR; and wherein the host data access rate for the additional VBR data not yet requested by the host is predicted based on the LBAs associated with the PCRs using a read look ahead (RLA) component of the data storage device.

12. The method of claim 11, further comprising predicting the host data access rate for the additional VBR data by:

determining an amount of data within the VBR data stream associated with a time interval between a first PCR and a second PCR of the VBR stream with the amount of data determined, in part, using the RLA; and estimating a future host data access rate for the additional VBR data based on the amount of data and the time interval between the first PCR and the second PCR.

13. The method of claim 12, wherein the first PCR is within a first portion of the VBR data requested by the host in a first read access request received by the data storage device and wherein the second PCR is within a second portion of the VBR data not yet requested by the host and with the amount of data associated with the second PCR determined, in part, using the RLA.

14. The method of claim 11, further comprising controlling, based on the predicted host data access rate, one or more of: a) a read trim operation; b) an amount of memory used for RLA cache operations; c) transfer random access memory (TRAM) operations; d) a sharing or subdivision of resources for storage and computations; and e) error correction code (ECC) operations.

15. The method of claim 14, further comprising controlling a complexity level of an ECC processing flow by comparing the predicted host data access rate to a threshold and (a) selecting a first ECC processing flow during intervals of time when the predicted host data access rate is below the threshold and (b) selecting a second different ECC processing flow during intervals of time when the predicted host data access rate is not below the threshold, wherein the first ECC processing flow is a more complex ECC processing flow than the second ECC processing flow.

16. The method of 15, further comprising (a) selecting an ECC processing flow configured to only detect but not correct errors as the first ECC processing flow and (b) selecting an ECC processing flow configured to both detect and correct errors as the second ECC processing flow.

17. The method of claim 11, further comprising controlling a machine learning image recognition operation based on the predicted host data rate by devoting a first amount of processing resources to the image recognition operation in response to the predicted host data rate exceeding a threshold and by devoting a second, different amount of processing resources to the image recognition operation in response to the predicted host data rate not exceeding the threshold.

18. The method of claim 11, further comprising:

(a) decreasing an amount of processing bandwidth devoted to a read scrub background operation performed by the data storage device, in response to the predicted host data access rate being higher than a threshold and (b) increasing the amount of processing bandwidth devoted to the read scrub background operation in response to the predicted host data access rate not being higher than the threshold.

19. The method of claim 11, further comprising performing speculative reads from the NVM using the RLA component.

20. The method of claim 19, wherein the NVM is a NAND-based NVM formed within a die and wherein the method further comprises storing data from the speculative reads within latches within the die.

21. An apparatus for use with a non-volatile memory (NVM), the apparatus comprising:

means for obtaining read commands from a host for reading variable bit rate (VBR) data from the NVM, each NVM read command including a logical block address (LBA);

means for reading the VBR data from the NVM;

means for transferring the VBR data from the NVM to the host as a VBR data stream;

means for identifying playback clock values within the VBR data stream;

means for predicting a host data access rate for additional VBR data not yet requested by the host based, in part, on the playback clock values and the LBAs; and means for controlling an NVM operation based on the predicted host data access rate;

wherein the playback clock values are program clock references (PCRs) and there is at least one LBA associated with each PCR; and wherein the means for predicting the host data access rate comprises means for predicting the host data access rate based on the LBAs associated with the PCRs using a read look ahead (RLA) component of the apparatus.

22. The apparatus of claim 21, further comprising means for performing speculative reads from the NVM using the RLA component.

* * * * *